United States Patent
Sakiyama et al.

(10) Patent No.: US 12,104,421 B2
(45) Date of Patent: Oct. 1, 2024

(54) FIXING MECHANISM, ACTUATOR, ACTUATOR FOR OPENING/CLOSING VEHICLE DOOR, AND FIXING METHOD

(71) Applicant: Mitsuba Corporation, Gunma (JP)

(72) Inventors: Takahiro Sakiyama, Kiryu (JP); Takashi Takizawa, Kiryu (JP); Toshinari Takahashi, Kiryu (JP); Yasuo Otani, Kiryu (JP)

(73) Assignee: Mitsuba Corporation, Kiryu (JP)

( * ) Notice: Subject to any disclaimer, the term of this patent is extended or adjusted under 35 U.S.C. 154(b) by 865 days.

(21) Appl. No.: 17/257,659

(22) PCT Filed: Jul. 3, 2019

(86) PCT No.: PCT/JP2019/026419
§ 371 (c)(1),
(2) Date: Jan. 4, 2021

(87) PCT Pub. No.: WO2020/031561
PCT Pub. Date: Feb. 13, 2020

(65) Prior Publication Data
US 2021/0270075 A1    Sep. 2, 2021

(30) Foreign Application Priority Data

Aug. 8, 2018    (JP) .................................. 2018-149557

(51) Int. Cl.
*E05F 15/622*    (2015.01)
*F16F 9/32*    (2006.01)

(52) U.S. Cl.
CPC .............. *E05F 15/622* (2015.01); *F16F 9/32* (2013.01); *E05Y 2201/41* (2013.01);
(Continued)

(58) Field of Classification Search
CPC ............. E05F 15/622; E05Y 2201/422; E05Y 2201/41; E05Y 2900/546; E05Y 2201/702;
(Continued)

(56) References Cited

U.S. PATENT DOCUMENTS

2003/0190215 A1*  10/2003  Harbin ................... F16B 19/05
                                                                   411/361
2009/0000201 A1*  1/2009  Fahl ....................... E05F 15/622
                                                                   49/280
(Continued)

FOREIGN PATENT DOCUMENTS

JP      65838050 U     3/1983
JP      H10274216 A    10/1998
(Continued)

OTHER PUBLICATIONS

Translation of written description of Japanese Patent No. JP 2017048817-A to Kimura obtained from website: https://worldwide.espacenet.com on Jan. 24, 2024.*
(Continued)

*Primary Examiner* — Pamela Rodriguez
(74) *Attorney, Agent, or Firm* — Wood Herron & Evans LLP

(57) ABSTRACT

A first joint portion (9) includes a swage groove (9c) which is formed throughout a whole circumference of an outer circumferential surface, and at least one inclined portion (96) which is formed in a part at a side edge of the swage groove (9c) and is inclined outward in an axial direction from the side edge of the swage groove (9c). In a first housing (6), a swage portion (89) is formed at a place corresponding to the swage groove (9c), where at least the inclined portion (96) is formed.

7 Claims, 9 Drawing Sheets

(52) U.S. Cl.
CPC ..... *E05Y 2201/422* (2013.01); *E05Y 2201/70* (2013.01); *E05Y 2201/702* (2013.01); *E05Y 2201/72* (2013.01); *E05Y 2600/506* (2013.01); *E05Y 2900/546* (2013.01)

(58) Field of Classification Search
CPC ........... E05Y 2201/70; E05Y 2600/506; E05Y 2201/72; B60J 5/10
See application file for complete search history.

(56) References Cited

U.S. PATENT DOCUMENTS

| | | | | |
|---|---|---|---|---|
| 2012/0031294 | A1* | 2/2012 | Aoyagi | F16B 17/004 |
| | | | | 102/530 |
| 2012/0205910 | A1* | 8/2012 | Danhash | F16L 33/2076 |
| | | | | 285/382.7 |
| 2016/0281887 | A1* | 9/2016 | Dobmeier | F16L 13/14 |
| 2018/0216390 | A1* | 8/2018 | Takizawa | F16H 1/32 |
| 2020/0024883 | A1* | 1/2020 | Scheuring | F16H 25/20 |

FOREIGN PATENT DOCUMENTS

| | | | |
|---|---|---|---|
| JP | 2017031634 A | 2/2017 | |
| JP | 2017048817 A | 3/2017 | |
| WO | 2010119613 A1 | 10/2010 | |

OTHER PUBLICATIONS

PCT Office, International Search Report issued in PCT/JP2019/026419 mailed on Oct. 1, 2019.

\* cited by examiner

FIXING MECHANISM, ACTUATOR, ACTUATOR FOR OPENING/CLOSING VEHICLE DOOR, AND FIXING METHOD

TECHNICAL FIELD

The present invention relates to a fixing mechanism, an actuator, an actuator for opening/closing a vehicle door, and a fixing method.

Priority is claimed on Japanese Patent Application No. 2018-149557, filed Aug. 8, 2018, the content of which is incorporated herein by reference.

BACKGROUND ART

In the related art, regarding a vehicle door opening/closing device, a configuration provided with an actuator is known. An actuator is driven in a telescopic manner in an axial direction between a part near an opening portion on a vehicle body side and a tailgate provided in this opening portion to be able to be opened and closed and performs an opening/closing operation of the tailgate (for example, refer to Patent Document 1).

The actuator in Patent Document 1 includes a first housing that has a tubular shape, and a second housing that is fitted to an inner circumferential surface of the first housing on a first end side and is provided in the first housing in a retractable manner. In addition, the actuator includes a motor that is provided inside the first housing on a second end side, and a drive shaft (screw shaft) that is rotatively driven upon reception of a rotation force of the motor. The drive shaft is disposed inside the first housing and the second housing in the axial direction.

In addition, an end part of the drive shaft on the motor side is rotatably supported via a bearing. The bearing is supported by a bearing holder fitted to the inner circumferential surface of the first housing on a first end side. A driven portion (nut member) is screwed onto the drive shaft. The driven portion is fixed to an inner tube provided on an inner side of the second housing in a radial direction and is not relatively rotatable with respect to the drive shaft.

A joint portion is fitted to each of the inner circumferential surfaces at the second end of the first housing and an end of the inner tube on a side opposite to the first housing. One of these joint portions is attached to a part near the opening portion on the vehicle body side. The other joint portion is attached to the tailgate.

According to such a configuration, when the drive shaft rotates, the driven portion moves in the axial direction of the drive shaft in a sliding manner. Consequently, the inner tube to which the driven portion is fixed and the second housing integrated with the inner tube move in a retractable manner with respect to the first housing. Accordingly, an opening/closing operation of the tailgate is performed.

Here, the bearing holder fitted to the inner circumferential surface of the first housing on a first end side and the joint portion fitted to the inner circumferential surface at a second end in the first housing are individually fixed to the first housing by swaging the first housing. The joint portion fitted to the inner circumferential surface at an end on the opposite side in the inner tube is fixed by swaging the inner tube.

In addition to a load in the axial direction, a rotation torque is also applied to each of the joint portions and the bearing holder. For this reason, there is a need to prevent the joint portion and the bearing holder from rotating relative to the first housing or the inner tube due to the rotation torque. That is, when the first housing or the inner tube is subjected to swage deformation, an outer circumferential surface of the joint portion or a bearing housing is also deformed at the same time at a plurality of places in a circumferential direction. According to such a configuration, places with swage deformation and places without swage deformation are formed side by side in the circumferential direction on the outer circumferential surface of the joint portion or the bearing housing. For this reason, the joint portion and the bearing holder can be prevented from rotating relative to the first housing or the inner tube.

CITATION LIST

Patent Literature

[Patent Document 1]
Japanese Unexamined Patent Application, First Publication No. 2017-31634

SUMMARY OF INVENTION

Technical Problem

However, when a joint portion or a bearing holder is deformed at the same time as a first housing or an inner tube is swaged, there is a need to make the mechanical strength of the joint portion or the bearing holder weaker than the mechanical strength of the first housing or the inner tube. For this reason, there is a possibility that there may be limitations on material selection of the first housing, the inner tube, the joint portion, and the bearing holder.

In consideration of a weight and the like of a tailgate, there is also a need to enhance the mechanical strength of the joint portion or the bearing holder. For this reason, there is a possibility that there may be more difficulty in material selection of the joint portion or the bearing holder.

Hence, the present invention provides a fixing mechanism, an actuator, an actuator for opening/closing a vehicle door, and a fixing method, in which the mechanical strength of an attachment body such as a joint portion or a bearing holder fitted into a tubular housing is enhanced and the housing can be easily swaged and relative rotation between the housing and the attachment body can be reliably prevented.

Solution to Problem

In order to resolve the foregoing problems, the present invention provides a fixing mechanism including a tubular housing, and an attachment body that is fitted to an inner circumferential surface of the housing. In the fixing mechanism, a swage portion is formed in the housing, and the housing and the attachment body are fixed to each other. The attachment body has at least one swage groove which is formed throughout a whole circumference of an outer circumferential surface, and at least one inclined portion which is formed in a part at a side edge of each of the swage grooves and is inclined outward in an axial direction of the housing from the side edge of the corresponding swage groove. In the housing, the swage portion is formed at a place corresponding to the swage groove, where at least the inclined portion is formed.

First, movement of the attachment body in the axial direction with respect to the housing can be reliably prevented by forming the swage portion of the housing at a place where the swage groove is formed. In addition, the inclined portion is only formed in a part at the side edge of the swage groove and is not formed throughout the whole circumference. For this reason, relative rotation with respect to the housing can also be reliably prevented by forming the swage portion of the housing at a place where the inclined portion is formed. Furthermore, since the swage portion is formed in the inclined portion, there is no need to cause the attachment body itself to be deformed. For this reason, the mechanical strength of the attachment body can be enhanced, and there is also no limitation on material selection.

In the fixing mechanism according to the present invention, at least the inclined portion may serve as a deformation allowing portion having a mechanical strength weaker than mechanical strengths at places other than the inclined portion of the attachment body.

According to such a configuration, for example, even when the mechanical strength of an attachment plate is enhanced, the swage portion of the housing can be easily formed. For this reason, while the mechanical strength of the attachment body is enhanced, the housing can be easily swaged and relative rotation between the housing and the attachment body can be reliably prevented.

In the fixing mechanism according to the present invention, the swage groove may be provided one. The attachment body may have a small width groove which is formed adjacent to the swage groove in the axial direction of the housing and is smaller than a width of the swage groove in the axial direction of the housing. A part between the swage groove and the small width groove may serve as the deformation allowing portion.

The mechanical strength between the swage groove and the small width groove becomes weak because the small width groove is formed next to the swage groove. For this reason, a part between the swage groove and the small width groove becomes the deformation allowing portion that is easily deformable. In this manner, the deformation allowing portion can be easily provided in the attachment body with a simple structure.

In the fixing mechanism according to the present invention, the small width groove may be formed throughout a whole circumference of the attachment body.

If the small width groove is formed in only a part in a circumferential direction, there is a need to form a swage portion in the housing along a place where the small width groove is formed. For this reason, there is a need to perform positioning between the attachment body and a tool for forming the swage portion. However, positioning between the attachment body and the tool is no longer necessary when the small width groove is formed throughout the whole circumference of the attachment body. Thus, the manufacturing step for forming the swage portion can be simplified.

In the fixing mechanism according to the present invention, the swage groove may be provided two. The attachment body may have the deformation allowing portion provided between the two swage grooves. The inclined portion may be provided at least two, and inclination directions of the inclined portions may alternate in a circumferential direction.

According to such a configuration, the housing can be easily swaged and relative rotation between the housing and the attachment body can be prevented more reliably.

In the fixing mechanism according to the present invention, the swage groove may be provided two. The attachment body may have a small width groove which is provided between the two swage grooves and is smaller than widths of the swage grooves in the axial direction of the housing.

A part between each of the swage grooves and the small width groove may serve as the deformation allowing portion.

According to such a configuration, the housing can be easily swaged and relative rotation between the housing and the attachment body can be prevented more reliably. In addition, variations of the fixing mechanism can be increased.

The present invention provides an actuator having the fixing mechanism described above. The attachment body is configured to serve as a joint portion which is provided at a first end of the housing and is attached to an attachment target portion.

According to such a configuration, the housing can be easily swaged and relative rotation between the housing and the joint portion can be reliably prevented.

The actuator according to the present invention may include an armature that is rotatably provided inside the housing; a speed reduction mechanism that is provided inside the housing, is configured to reduce a speed of rotation of the armature, and is configured to output a reduced rotation; a drive shaft that is joined to the speed reduction mechanism and extends in the axial direction of the housing; a driven portion that is screwed onto the drive shaft and is configured to move along the drive shaft in a sliding manner in accordance with rotation of the drive shaft; and two of the attachment bodies. The attachment bodies may serve as bearing holders which are provided at the second end on a side opposite to the joint portion and the a first end of the housing and rotatably support the drive shaft.

According to such a configuration, the housing can be easily swaged, and thus it is possible to provide an actuator in which relative rotation between the housing and the joint portion and between the housing and the bearing holder can be reliably prevented.

The present invention provides an actuator for opening/closing a vehicle door, in which the actuator described above may be used for driving of opening/closing a door which is provided to be able to open and close an opening portion.

According to such a configuration, while the mechanical strength of the attachment body such as the joint portion or the bearing holder fitted into the tubular housing is enhanced, the housing can be easily swaged and relative rotation between the housing and the attachment body can be reliably prevented.

The present invention provides a fixing method for fixing a tubular housing and an attachment body fitted to an inner circumferential surface of the housing. The fixing method includes forming at least one swage groove throughout a whole circumference of an outer circumferential surface of the attachment body, and forming, in at least a part at a side edge of each of the swage grooves, a deformation allowing portion having a mechanical strength weaker than mechanical strengths at places other than the part; and forming a swage portion by pressurizing a position corresponding to the deformation allowing portion in the housing and the swage groove at the position corresponding to the deformation allowing portion from the outer circumferential surface side of the housing, and forming, in the deformation allowing portion, an inclined portion inclined outward in an axial direction of the attachment body with respect to the corresponding swage groove.

According to such a method, while the mechanical strength of the attachment body such as the joint portion or the bearing holder fitted into the tubular housing is enhanced, the housing can be easily swaged and relative rotation between the housing and the attachment body can be reliably prevented.

In the fixing method according to the present invention, the swage groove may be formed one, a small width groove may be formed in at least a part adjacent to the swage groove, and a part between the swage groove and the small width groove may serve as the deformation allowing portion.

According to such a method, the deformation allowing portion can be easily provided in the attachment body with a simple structure.

In the fixing method according to the present invention, the small width groove may be formed on both sides in the axial direction of the swage groove throughout the whole circumference of the attachment body.

When the small width groove is formed throughout the whole circumference of the attachment body by such a method, positioning between the attachment body and the tool is no longer necessary. For this reason, the manufacturing step for forming the swage portion can be simplified.

In the fixing method according to the present invention, the swage groove may be formed two, a part between the two swage grooves may serve as the deformation allowing portion, and inclination directions of the inclined portions may alternate in a circumferential direction.

According to such a method, the housing can be easily swaged and relative rotation between the housing and the attachment body can be prevented more reliably.

Advantageous Effects of Invention

According to the present invention, movement of the attachment body in the axial direction with respect to the housing can be reliably prevented by forming the swage portion of the housing at a place where the swage groove is formed. In addition, the inclined portion is only formed in a part at the side edge of the swage groove and is not formed throughout the whole circumference. For this reason, relative rotation with respect to the housing can also be reliably prevented by forming the swage portion of the housing at a place where the inclined portion is formed. Furthermore, since the swage portion is formed in the inclined portion, there is no need to cause the attachment body itself to be deformed. For this reason, the mechanical strength of the attachment body can be enhanced, and there is also no limitation on material selection.

DESCRIPTION OF EMBODIMENTS

Next, embodiments of the present invention will be described on the basis of the drawings.

First Embodiment (Actuator for Opening/Closing Vehicle Door)

Figure 1:
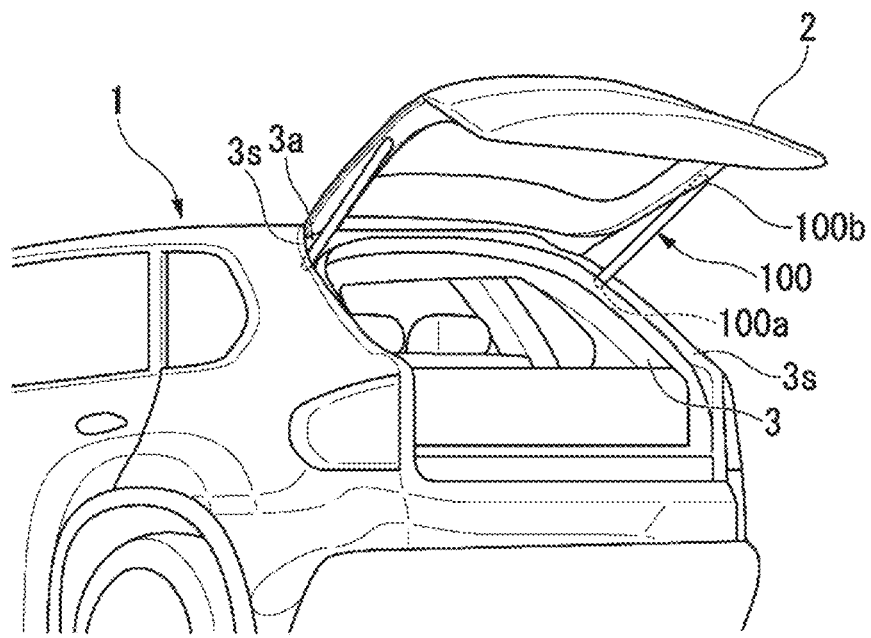
FIG. 1 is a perspective view illustrating an example of an automobile including an actuator for opening/closing a vehicle door according to a first embodiment of the present invention.

FIG. 1 is a perspective view illustrating an example of an automobile 1 including an actuator 100 for opening/closing a vehicle door (which will hereinafter be simply referred to as an actuator 100) according to a first embodiment of the present invention.

As illustrated in FIG. 1, the actuator 100 opens and closes a tailgate (door) 2 of the automobile 1, for example. The tailgate 2 is provided in an upper portion 3*a* of an opening portion 3 formed in a rear portion of a vehicle body of the automobile 1 such that the opening portion 3 can be opened and closed via a hinge mechanism (not illustrated).

The actuator 100 is individually provided on both left and right sides or one side of the opening portion 3 in a vehicle width direction. Further, a first end 100*a* of the actuator 100 is turnably joined to an outer frame portion 3*s* of the opening portion 3 with a ball stud (not illustrated) therebetween. The second end 100*b* of the actuator 100 is turnably joined to the tailgate 2 with a ball stud (not illustrated) therebetween.

In the following description, the opening portion 3 side of the actuator 100 may be referred to as a first end side or one side, and the tailgate 2 side may be referred to as a second end side or the other side.

Figure 2:
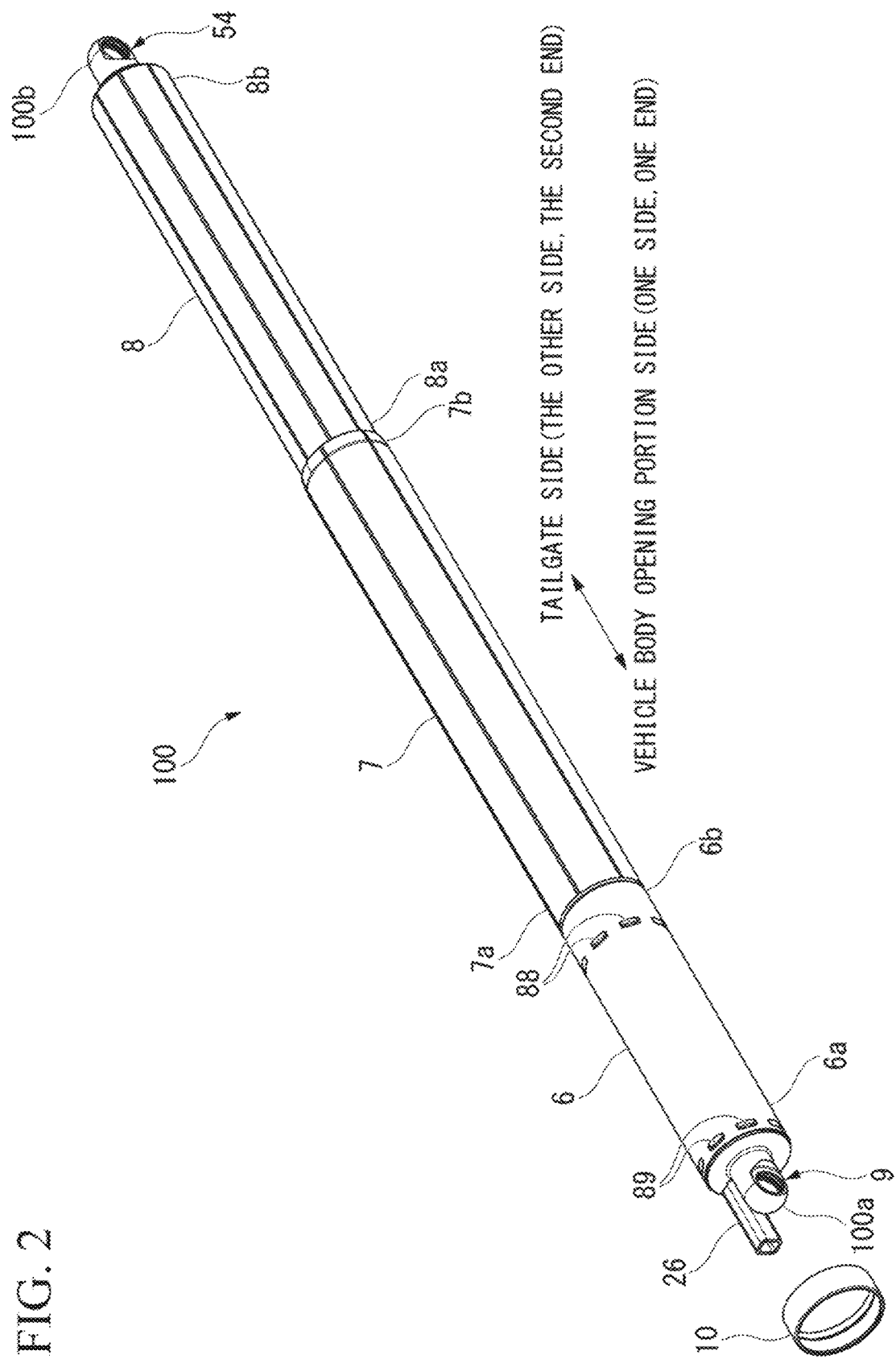
FIG. 2 is an exploded perspective view of a part of the actuator according to the first embodiment of the present invention.
Figure 3:
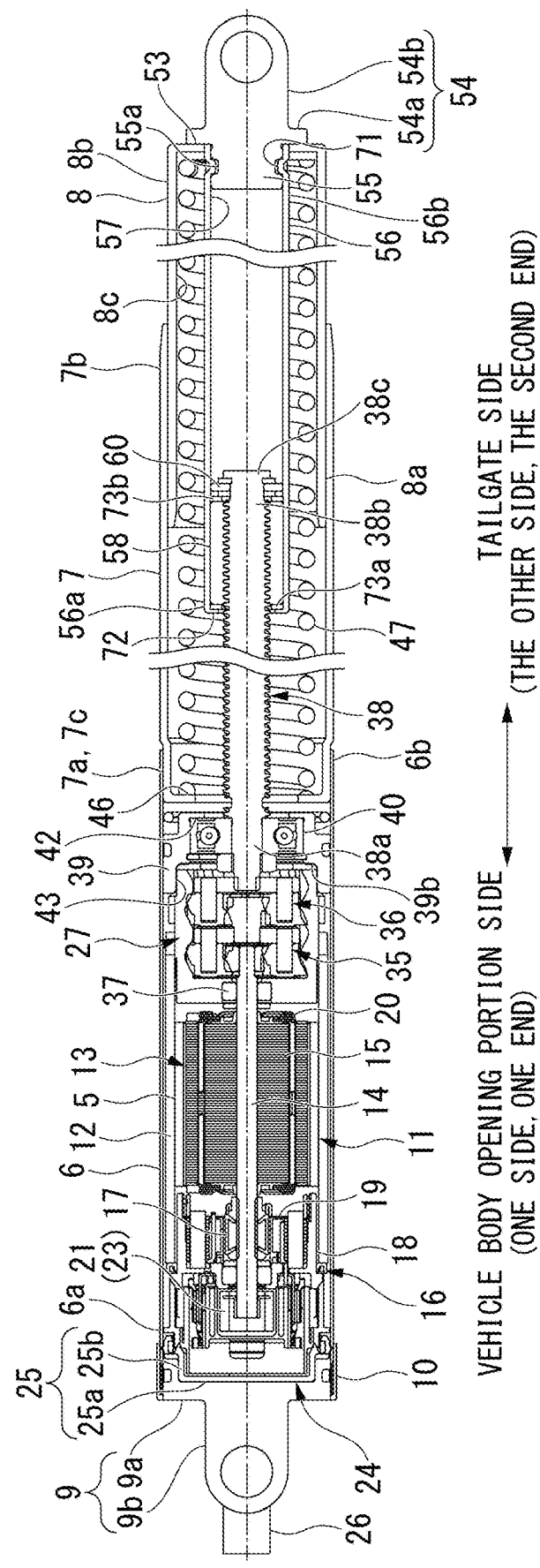
FIG. 3 is a cross-sectional view of the actuator in an axial direction according to the first embodiment of the present invention.

FIG. 2 is an exploded perspective view of a part of the actuator 100. FIG. 3 is a cross-sectional view of the actuator 100 in an axial direction.

As illustrated in FIGS. 2 and 3, the actuator 100 is a rod-shaped body including three housings 6 to 8, that is, a first housing (corresponding to a housing in the claims) 6 which has substantially a cylindrical shape, a second housing 7 which has substantially a cylindrical shape and of which a first end 7*a* (an end on the left side in FIGS. 2 and 3) is fitted and fixed to an inner circumferential surface at a second end 6b (an end on the right side in FIGS. 2 and 3) of the first housing 6, and a third housing 8 which has substantially a cylindrical shape and is fitted to an inner circumferential surface at the second end 7b of the second housing 7 in a retractable manner.

In the following description, a direction along a central axis of each of the housings 6 to 8 will be simply referred to as the axial direction, a radial direction of each of the housings 6 to 8 will be simply referred to as the radial direction, and a direction along an outer circumferential surface of each of the housings 6 to 8 will be simply referred to as the circumferential direction.

The first housing 6 is formed of a metal material such as iron, for example. A first joint portion 9, which is joined to a ball stud (not illustrated) provided in the outer frame portion 3s (refer to FIG. 1) of the opening portion 3, is provided at a first end 6a of this first housing 6.

(First Joint Portion)

Figure 4:
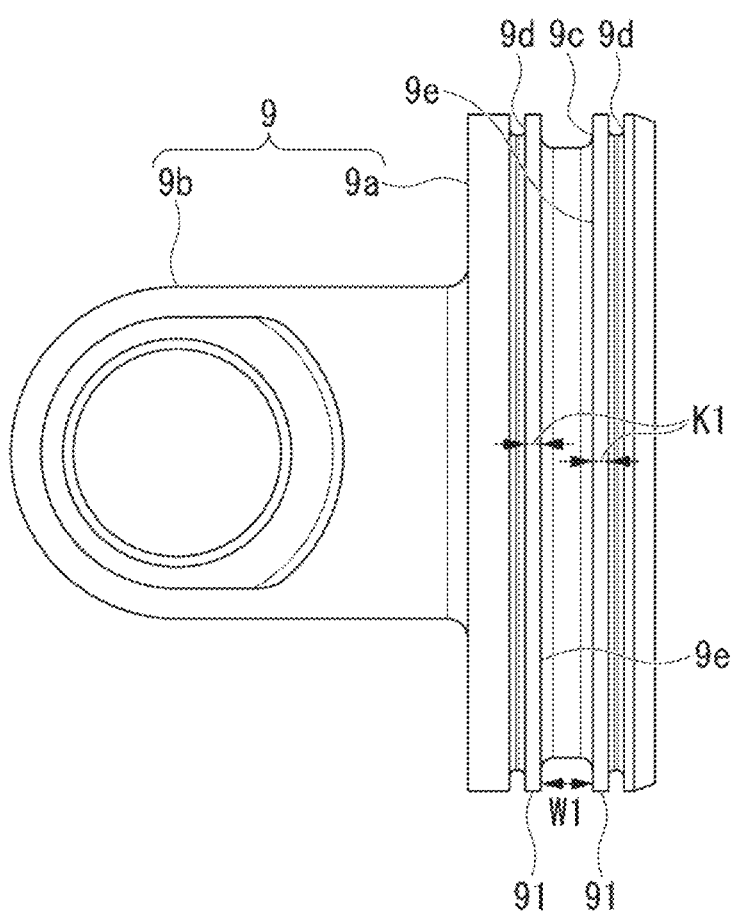
FIG. 4 is a side view of a first joint portion according to the first embodiment of the present invention.

FIG. 4 is a side view of the first joint portion 9.

As illustrated in FIGS. 3 and 4, in the first joint portion 9, a plate portion 9a which has substantially a disk shape and is fitted to an inner circumferential surface at the first end 6a in the first housing 6 and a socket portion 9b which protrudes to one side (outward) in the axial direction of the first housing 6 from the plate portion 9a are integrally formed.

An insertion hole (not illustrated) through which a harness cover 26 (which will be described below) can be inserted is formed in the plate portion 9a. A swage groove 9c is formed substantially in the middle in the axial direction throughout the whole circumference of the outer circumferential surface of the plate portion 9a. The swage groove 9c allows swage fixing of the first joint portion 9 to the first housing 6.

Small width grooves 9d smaller than a width W1 of the swage groove 9c in the axial direction are formed on both sides of the swage groove 9c in the axial direction with a predetermined interval K1 therebetween. The small width grooves 9d are also formed throughout the whole circumference. Deformation allowing portions 91 are formed between these small width grooves 9d and the swage groove 9c by forming the small width grooves 9d. The deformation allowing portions 91 have a mechanical strength weaker than those at places other than the deformation allowing portions 91 in the first joint portion 9. That is, the mechanical strengths of the deformation allowing portions 91 become weaker than those at places other than these deformation allowing portions 91 because the small width grooves 9d are formed. The dimensions of the predetermined interval K1 are set as dimensions with which the mechanical strengths of the deformation allowing portions 91 become weaker than the mechanical strengths at places other than these deformation allowing portions 91.

The first joint portion 9 is subjected to swage fixing to the first housing 6 utilizing the deformation allowing portions 91 and the swage groove 9c described above. Swage fixing is performed by forming a plurality of swage portions 89 on the first end 6a side of the first housing 6. The plurality of swage portions 89 are disposed at equal intervals in the circumferential direction. Details of a method for performing swage fixing will be described below.

In addition, an end cover 10 having substantially a cylindrical shape is mounted at the first end 6a of the first housing 6. The end cover 10 is fitted and fixed to an outer circumferential surface at the first end 6a of the first housing 6 and covers a place where the first joint portion 9 is subjected to swage fixing to the first housing 6.

(Motor Portion)

A motor portion 11 is stored in the first housing 6.

The motor portion 11 includes a yoke 12 having substantially a cylindrical shape, a magnet 5 fixed to an inner circumferential surface of the yoke 12, an armature 13 rotatably provided on an inner side of the yoke 12 in the radial direction, and a brush holder unit 16 supplying electricity to the armature 13. The yoke 12 is formed of a conductive metal. The yoke 12 is set to have an outer diameter smaller than an inner diameter of the first housing 6 by a predetermined dimension.

The armature 13 provided on an inner side of the yoke 12 in the radial direction includes a shaft 14 which is provided rotatably inside the yoke 12, an armature core 15 which is fitted and fixed to an outer circumferential surface of the shaft 14 and is formed of a magnetic material, a coil 20 which is wound around the armature core 15, and a commutator 17 which is fitted and fixed to the outer circumferential surface of the shaft 14 while adjacent to the armature core 15 and to which a terminal portion of the coil 20 is connected.

The shaft 14 extends in the axial direction at the center of the yoke 12 in the radial direction. Further, a first end of the shaft 14 is inserted through the brush holder unit 16 and is rotatably supported by this brush holder unit 16. A second end of the shaft 14 is joined to a speed reduction gear portion 27, which will be described below. A sensor magnet 21 is attached to the first end of the shaft 14. The sensor magnet 21 constitutes one side of a rotation position detecting device 23 for detecting a rotation position of the shaft 14.

The brush holder unit 16 supplying electricity to the armature 13 includes a resin brush holder 18 subjected to swage fixing to a first end 12a of the yoke 12, and a brush 19 held by the brush holder 18. This brush 19 comes into sliding contact with the commutator 17. The brush 19 is electrically connected to an external power source (for example, a battery) via a harness (not illustrated). Accordingly, electricity of the external power source is supplied to the coil 20 via the brush 19 and the commutator 17.

A sensor substrate (not illustrated) is provided in the brush holder 18 such that it radially faces the outer circumferential surface of the sensor magnet 21 provided in the shaft 14. The sensor substrate constitutes the other side of the rotation position detecting device 23. A magnetic detection element (not illustrated) for detecting a magnetic change on the outer circumferential surface of the sensor magnet 21 is mounted on the sensor substrate. As a result, the rotation position of the shaft 14 can be detected by the rotation position detecting device 23.

A seal portion 24 is mounted on the first joint portion 9 side of the brush holder unit 16. The seal portion 24 is formed of an elastic rubber-based material. The seal portion 24 has a seal main body 25 formed to have substantially a tubular bottomed shape such that it covers the brush holder unit 16 from the first joint portion 9 side. That is, the seal main body 25 is constituted of a bottom portion 25a which is sandwiched between the brush holder 18 and the plate portion 9a of the first joint portion 9; and a circumferential wall portion 25b which has substantially a cylindrical shape, extends from an outer circumferential edge of the bottom portion 25a to a side opposite to the first joint portion 9, and is interposed between the brush holder unit 16 and the inner circumferential surface of the first housing 6.

The harness cover 26 is formed in the bottom portion 25a of the seal main body to protrude toward one side (outward) in the axial direction. The harness cover 26 is formed to have substantially a pipe shape and allows the inside and the outside of the seal main body 25 to communicate with each other. A harness (not illustrated) for electrically connecting the external power source (not illustrated) and the brush 19 to each other is inserted through the inside of the harness cover 26 having such a configuration.

According to such a configuration, when electricity of the external power source is supplied to the coil 20 via the harness (not illustrated), the brush 19, and the commutator 17, a magnetic field is formed in the armature core 15. Further, the shaft 14 is rotatively driven around the central axis thereof due to a magnetic attractive force or a magnetic repulsive force generated between this magnetic field and the magnet fixed to the yoke 12. In addition, the sensor magnet 21 rotates integrally with the shaft 14. A magnetic change at the time when this sensor magnet 21 rotates is detected by the rotation position detecting device 23, and thus the rotation position of the shaft 14 is detected.

(Speed Reduction Gear Portion)

The speed reduction gear portion 27 joined to the second end of the shaft 14 is constituted as a two-stage planetary speed reduction mechanism having a first stage planetary gear portion 35 and a second stage planetary gear portion 36. The speed reduction gear portion 27 reduces the speed of rotation of the shaft 14 in two stages by the first stage planetary gear portion 35 and the second stage planetary gear portion 36 and outputs the reduced rotation. An output of the speed reduction gear portion 27 is transmitted to a screw shaft 38 joined to the second stage planetary gear portion 36.

The screw shaft 38 is rotatively driven around the central axis of the shaft 14 in the motor portion 11. A first end 38a of the screw shaft 38 on the speed reduction gear portion 27 side is rotatably supported by a bearing holder 39. The screw shaft 38 extends such that it protrudes from the bearing holder 39 toward the other side in the axial direction. The screw shaft 38 is a so-called trapezoidal screw, and screw threads are formed on an outer circumferential surface thereof.

(Bearing Holder)

Figure 5:
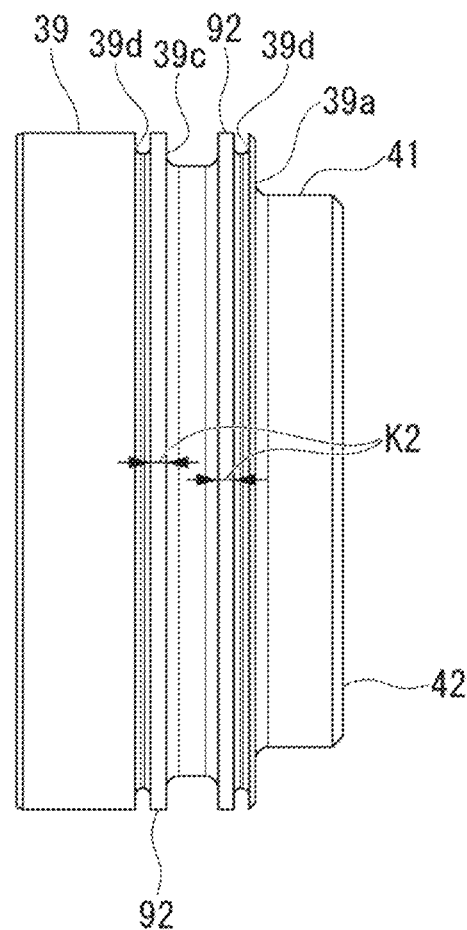
FIG. 5 is a side view of a bearing holder according to the first embodiment of the present invention.

FIG. 5 is a side view of the bearing holder 39.

As illustrated in FIGS. 3 and 5, the bearing holder 39 is formed to have substantially a cylindrical shape. A diameter decreased portion 41 having a decreased outer diameter via a stepped surface 39a is formed on an outer circumferential surface of the bearing holder 39 on a side opposite to the speed reduction gear portion 27 substantially from the middle in the axial direction. An inner flange portion 42 is formed at a distal end (an end on a side opposite to the speed reduction gear portion 27) of the diameter decreased portion 41.

A bearing 40 is inserted or press-fitted to an inner circumferential surface of the bearing holder 39 within a range from the inner flange portion 42 substantially to the middle in the axial direction. The bearing holder 39 rotatably supports the first end 38a of the screw shaft 38 with this bearing 40 therebetween.

A diameter increased portion 43 having an increased inner diameter via a stepped surface 39b is formed on the inner circumferential surface of the bearing holder 39 on the speed reduction gear portion 27 side from a place where the bearing 40 is disposed. The second end side of the speed reduction gear portion 27 is inserted into this diameter increased portion 43.

A swage groove 39c is formed throughout the whole circumference of the outer circumferential surface of the bearing holder 39 close to the diameter decreased portion 41. The swage groove 39c allows swage fixing of the bearing holder 39 to the first housing 6.

Small width grooves 39d are formed on both sides of the swage groove 39c in the axial direction with a predetermined interval K2 therebetween. The small width grooves 39d are also formed throughout the whole circumference. A deformation allowing portion 92 is formed between these small width grooves 39d and the swage groove 39c by forming the small width grooves 39d. The deformation allowing portion 92 has a mechanical strength weaker than those at places other than the deformation allowing portion 92 in the bearing holder 39. That is, the mechanical strength of the deformation allowing portion 92 becomes weaker than those at places other than this deformation allowing portion 92 because the small width grooves 39d are formed. The dimensions of the predetermined interval K2 are dimensions with which the mechanical strength of the deformation allowing portion 92 becomes weaker than the mechanical strengths at places other than this deformation allowing portion 92.

The bearing holder 39 is subjected to swage fixing to the first housing 6 utilizing the deformation allowing portion 92 and the swage groove 39c described above. Swage fixing is performed by forming a plurality of swage portions 88 on the second end 6b side of the first housing 6. The plurality of swage portions 88 are disposed at equal intervals in the circumferential direction. Details of a method for forming these swage portions 88 (a method for performing swage fixing) will also be described below together with swage fixing of the first housing 6 and the first joint portion 9 described above.

The second housing 7 is provided around the screw shaft 38 rotatably supported by the bearing holder 39 such that a part around this screw shaft 38 is covered.

The second end 6b of the first housing 6 on the speed reduction gear portion 27 side protrudes toward the other side (the right side in FIG. 3) beyond the bearing holder 39 and is coupled to the second housing 7.

(Second Housing)

As illustrated in FIGS. 2 and 3, the second housing 7 is formed of a resin material or the like. The outer diameter of the second housing 7 is set to be substantially the same as the outer diameter of the first housing 6 except for the first end 7a side fitted to the second end 6b of the first housing 6. The first end 7a side of the second housing 7 is formed to decrease in diameter due to a step and serves as a diameter decreased portion 7c. This diameter decreased portion 7c is press-fitted and fixed to the second end 6b of the first housing 6. Accordingly, the first housing 6 and the second housing 7 are integrated in a state in which the outer circumferential surface of the first housing 6 and the outer circumferential surface of the second housing 7 are substantially flush with each other.

The second housing 7 is formed such that the second end 7b of the second housing 7 slightly protrudes beyond the second end (distal end part) 38b of the screw shaft 38 in a state in which the first end 7a side of this second housing 7 is fitted and fixed to the second end 6b of the first housing 6. The length of the diameter decreased portion 7c of the second housing 7 is a length with which the diameter decreased portion 7c does not abut the bearing holder 39 when it is press-fitted to the second end 6b of the first housing 6.

An inner flange 46 constituted by being bent to an inner side in the radial direction is formed at the first end 7a of the second housing 7. A first end of a coil spring 47 (which will be described below) abuts this inner flange 46.

The coil spring 47 formed to have a spiral shape along the inner circumferential surface of this second housing 7 is provided in the second housing 7. The first end of this coil spring 47 abuts the inner flange 46 of the second housing 7. A free length of the coil spring 47 is sufficiently longer than the length of the second housing 7. For this reason, in a state in which a first end of the coil spring 47 is brought into contact with the inner flange 46 of the second housing 7, the second end of the coil spring 47 protrudes from the second end 7b of the second housing 7.

(Third Housing)

The third housing 8 which has substantially a cylindrical shape and is provided at the second end 7b of the second housing 7 in a retractable manner is set to have an outer diameter slightly smaller than the outer diameter of the second housing 7. Further, a first end 8a side of the third housing 8 on the motor portion 11 side is inserted into the second end 7b of the second housing 7. Accordingly, the third housing 8 can move in a retractable manner from the second end 7b of the second housing 7. Further, the second end side of the coil spring 47 is stored in the third housing 8.

An inner flange 53 constituted by being bent to an inner side in the radial direction is formed at the second end 8b of the third housing 8. In this inner flange 53, the second end of the coil spring 47 abuts an inner surface side, and a second joint portion 54 abuts an outer surface side.

(Second Joint Portion)

Figure 6:
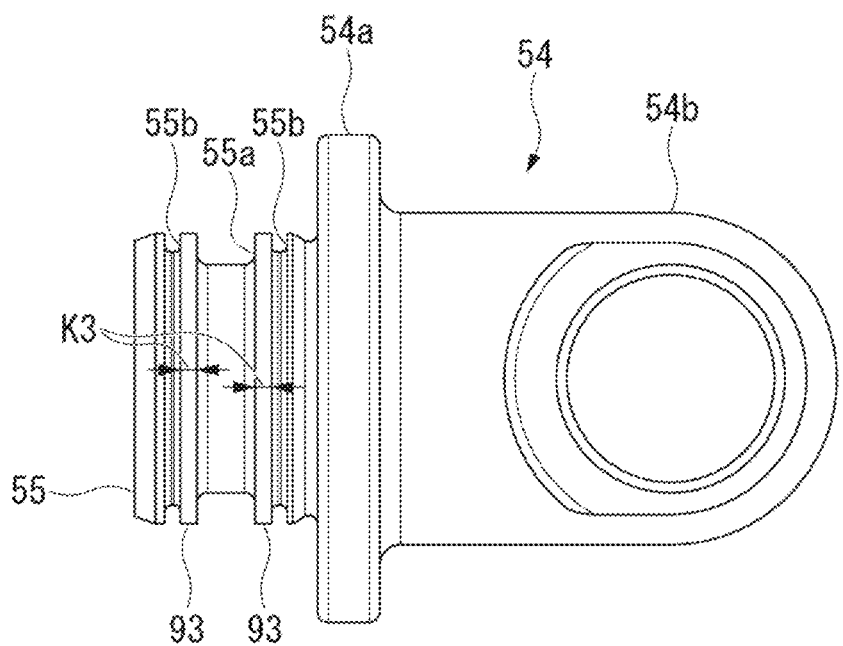
FIG. 6 is a side view of a second joint portion according to the first embodiment of the present invention.

FIG. 6 is a side view of the second joint portion 54.

As illustrated in FIGS. 1, 3, and 6, the second joint portion 54 is joined to a ball stud (not illustrated) provided in the tailgate 2. The second joint portion 54 is realized by integrally forming a plate portion 54a which has substantially a disk shape and comes into contact with the inner flange 53 of the third housing 8, and a socket portion 54b which protrudes to the other side (outward) in the axial direction from the plate portion 54a.

The plate portion 54a has an outer diameter to an extent slightly smaller than the outer diameter of the third housing 8. A fixing projection portion 55 which has substantially a columnar shape and protrudes into the third housing 8 with the inner flange 53 of the third housing 8 therebetween is integrally formed substantially in the middle of the plate portion 54a in the radial direction. A swage groove 55a is formed substantially in the middle of the fixing projection portion 55 in the axial direction throughout the whole circumference. The swage groove 55a allows swage fixing of an inner tube (corresponding to a housing in the claims) 56 (which will be described below) to the fixing projection portion 55.

Small width grooves 55b are formed on both sides of the swage groove 55a in the axial direction with a predetermined interval K3 therebetween. The small width grooves 55b are also formed throughout the whole circumference. A deformation allowing portion 93 is formed between these small width grooves 55b and the swage groove 55a by forming the small width grooves 55b. The deformation allowing portion 93 has a mechanical strength weaker than those at places other than the deformation allowing portion 93 in the second joint portion 54. That is, the mechanical strength of the deformation allowing portion 93 becomes weaker than those at places other than this deformation allowing portion 93 because the small width groove 55b is formed. The dimensions of the predetermined interval K3 are dimensions with which the mechanical strength of the deformation allowing portion 93 becomes weaker than the mechanical strengths at places other than this deformation allowing portion 93. The second end 56b of the inner tube 56 is subjected to swage fixing to the fixing projection portion 55 utilizing the deformation allowing portion 93 and the swage groove 55a described above.

(Inner Tube)

Figure 7:
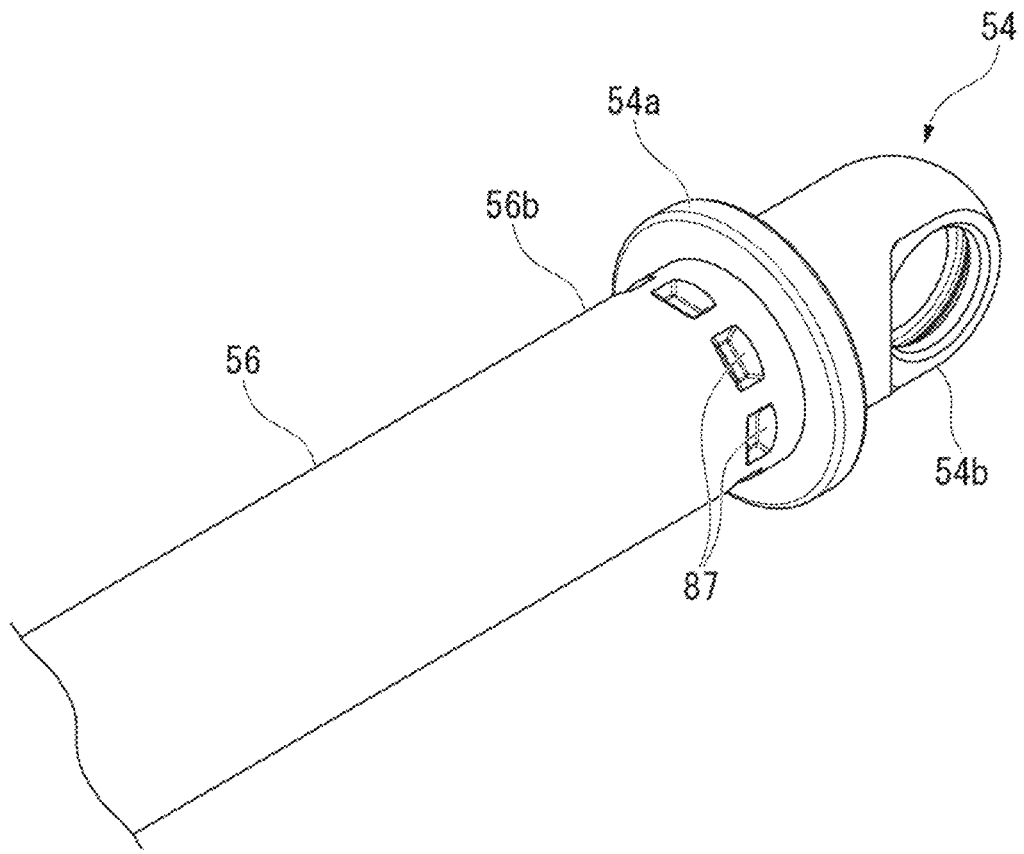
FIG. 7 is a perspective view illustrating a state in which an inner tube and the second joint portion are fixed to each other according to the first embodiment of the present invention.

FIG. 7 is a perspective view illustrating a state in which the inner tube 56 and the second joint portion 54 are fixed to each other.

As illustrated in FIGS. 3 and 7, the inner tube 56 is formed by performing drawing processing with aluminum, for example. The outer circumferential surface at the second end 56b of the inner tube 56 is fitted to an inner circumferential surface of the inner flange 53 of the third housing 8. The second end side of the coil spring 47 is stored in a space formed between the inner tube 56 and the third housing 8.

An outer circumferential surface of the fixing projection portion 55 of the second joint portion 54 is fitted to the inner circumferential surface at the second end 56b of the inner tube 56. A plurality of swage portions 87 are formed at the second end 56b of the inner tube 56 at positions corresponding to the swage groove 55a of the fixing projection portion 55. Due to these swage portions 87, swage fixing of the inner tube 56 and the fixing projection portion 55 of the second joint portion 54 is performed. The plurality of swage portions 87 are disposed at equal intervals in the circumferential direction.

The length of the inner tube 56 in the axial direction is slightly longer than the length of the third housing 8 in the axial direction. For this reason, the first end 56a of the inner tube 56 is inserted into the second housing 7 with the first end 8a of the third housing 8 therebetween.

An inner flange 72 constituted by being bent to an inner side in the radial direction is formed at the first end 56a of the inner tube 56. The screw shaft 38 is inserted on an inner side of this inner flange 72 in the radial direction. A nut member 58 is fixed to the inner circumferential surface of the inner tube 56 on an inner side (the other side) of the inner flange 72.

Movement of the nut member 58 in the axial direction is restricted by two snap rings 73a and 73b. The two snap rings 73a and 73b are disposed on the inner circumferential surface of the inner tube 56 and both sides of the nut member 58 in the axial direction. Accordingly, the nut member 58 is fixed to the inner tube 56. The second end 38b side of the screw shaft 38 is screwed to the nut member 58.

Here, the nut member 58 is fixed to the inner tube 56. Moreover, the inner tube 56 is fixed to the second joint portion 54. The second joint portion 54 is joined to the ball stud (not illustrated) provided in the tailgate 2 (refer to FIG. 1). For this reason, when the screw shaft 38 is rotated, the nut member 58 does not rotate together with the screw shaft 38. When the screw shaft 38 is rotated, the nut member 58 moves along the screw shaft 38.

An outer flange portion 38c subjected to buckling deformation is formed at the second end 38b of the screw shaft 38. A stopper 60 having substantially a toric shape is provided such that it is interlocked with this outer flange portion 38c. Due to the stopper 60, the nut member 58 is prevented from coming out of the screw shaft 38.

Here, the length of the third housing 8 is set as a length to an extent that the coil spring 47 is slightly compressed by the inner flange 53 in a state in which the nut member 58 is positioned in the screw shaft 38 on a side closest to the second end 38b. That is, the coil spring 47 biases the third housing 8 in a direction in which it protrudes from the second housing 7 at all times.

The third housing 8 is joined to the screw shaft 38 with the inner tube 56 and the nut member 58 therebetween. For this reason, movement of the third housing 8 in a direction in which it protrudes from the second housing 7 is restricted. As a result, the coil spring 47 biases the inner flange 46 of the second housing 7 toward the motor portion 11 side at all times.

(Operation of Actuator for Opening/Closing Vehicle Door)

Next, operation of the actuator 100 will be described.

The shaft 14 rotates when electricity of an external power source (not illustrated) is supplied to the motor portion 11 in response to an operation of an operator and the shaft 14 of the motor portion 11 is rotatively driven. The rotation of the shaft 14 is reduced in speed by the speed reduction gear portion 27 and is transmitted to the screw shaft 38.

When the screw shaft 38 rotates, the nut member 58 moves in a sliding manner along this screw shaft 38. The nut member 58 is fixed to the inner tube 56 included in the third housing 8. Accordingly, the third housing 8 moves in a retractable manner with respect to the second housing 7 and the actuator 100 moves in a telescopic manner.

When the third housing 8 moves in with respect to the second housing 7, the tailgate 2 (refer to FIG. 1) provided in the opening portion 3 of the automobile 1 is closed. When the third housing 8 protrudes with respect to the second housing 7, the tailgate 2 provided in the opening portion 3 of the automobile 1 is opened. At this time, even if operation of the motor portion 11 is stopped in a state in which the actuator 100 is extended, a state in which the third housing 8 protrudes with respect to the second housing 7 is maintained due to a biasing force of a coil spring 47.

(Swaging Fixing Method)

Next, on the basis of FIGS. 8A, 8B, and 9, a method for performing swaging fixing of the first joint portion 9 to the first housing 6, a method for performing swaging fixing of the bearing holder 39 to the first housing 6, and a method for performing swaging fixing of the inner tube 56 and the fixing projection portion 55 of the second joint portion 54 will be described. Since the swaging fixing methods of the portions are the same as each other, in the following description, the method for performing swaging fixing of the first joint portion 9 to the first housing 6 of the portions will be described as an example.

Figure 8A:
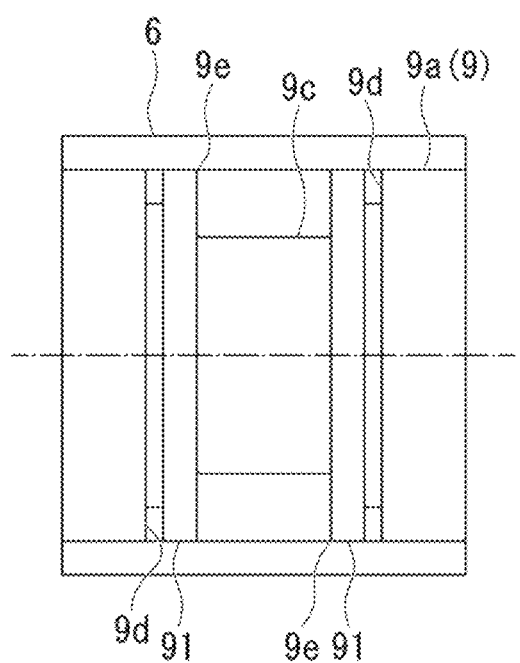
FIG. 8A is a view showing a state before the first joint portion is subjected to swage fixing to a first housing according to the first embodiment of the present invention.

FIG. 8A is a view showing a state before the first joint portion 9 is subjected to swage fixing to the first housing 6. FIG. 8B is a view showing a state after the first joint portion 9 is subjected to swage fixing to the first housing 6.

As illustrated in FIG. 8A, the plate portion 9a of the first joint portion 9 is fitted to the inner circumferential surface of the first housing 6.

Figure 8B:
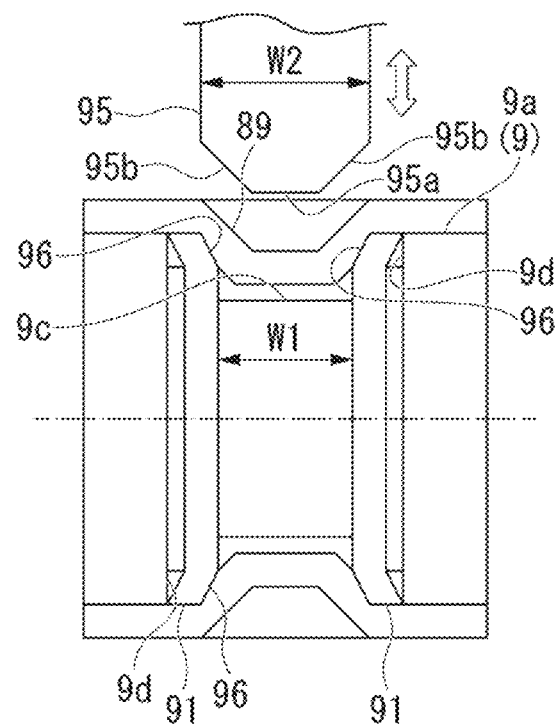
FIG. 8B is a view showing a state after the first joint portion is subjected to swage fixing to the first housing according to the first embodiment of the present invention.

Subsequently, as illustrated in FIG. 8B, a position corresponding to the swage groove 9c of the first housing 6 is pressurized using a tool 95 for swaging from an outward side in the radial direction. A width W2 of the tool 95 in the axial direction is wider than the width W1 of the swage groove 9c in the axial direction. Chamfered portions 95b are formed on a pressurization surface 95a of the tool 95 at corner portions on both sides in the axial direction.

When the first housing 6 is pressurized from an outward side in the radial direction using such a tool 95, the first housing 6 is deformed toward an inner side in the radial direction such that it is inserted into the swage groove 9c.

Here, since the width W2 of the tool 95 in the axial direction is set to be wider than the width W1 of the first joint portion 9 (attachment body) of the swage groove 9c in the axial direction, a pressurizing force of the tool 95 is also applied to the deformation allowing portions 91 disposed on both sides of the swage groove 9c. Since the deformation allowing portions 91 have a mechanical strength weaker than those at places other than the deformation allowing portions 91 in the first joint portion 9, the deformation allowing portions 91 are deformed such that they are pressed and expanded by the tool 95. For this reason, inclined portions 96 inclined in the axial direction are formed at places pressurized by the tool 95 in the whole circumferences of the deformation allowing portions 91.

Figure 9:
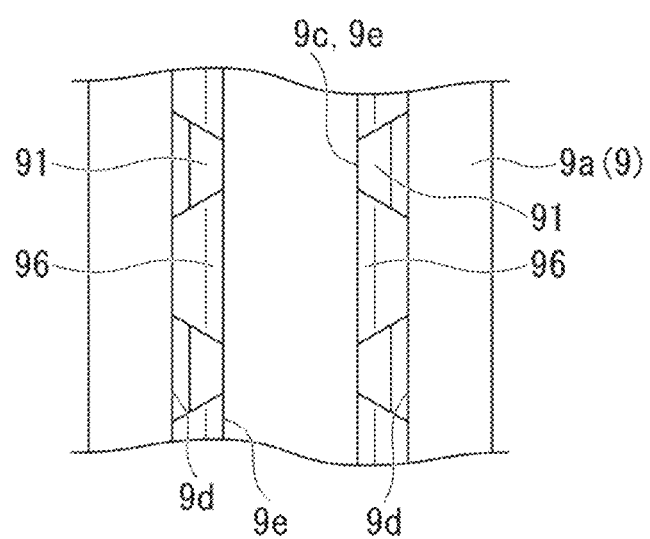
FIG. 9 is a simplified view illustrating a state in which an inclined portion is formed in a part of a deformation allowing portion using a tool according to the first embodiment of the present invention.

FIG. 9 is a simplified view illustrating a state in which the inclined portions 96 are formed in parts of the deformation allowing portions 91 in the first joint portion 9 by the tool 95, and the diagram corresponds to a side view of the first joint portion 9.

As illustrated in FIG. 9, using the tool 95, a plurality of inclined portions 96 are formed in parts of the deformation allowing portions 91 instead of being formed throughout the whole circumferences of the deformation allowing portions 91. The inclined portions 96 are formed at equal intervals in the circumferential direction. The first housing 6 is deformed toward an inner side in the radial direction such that it is inserted into these inclined portions 96. In this manner, the first housing 6 is deformed toward an inner side in the radial direction such that it straddles the inclined portions 96 positioned on both sides with the swage groove 9c interposed therebetween, and this deformed place becomes the swage portions 89 (refer to FIGS. 2 and 8B).

In this manner, in the first housing 6 and the first joint portion 9 described above, the swage portions 89 are formed at places where the respective inclined portions 96 communicating with the swage groove 9c are formed. For this reason, places where the inclined portions 96 are not formed inhibit relative rotation between the first housing 6 and the first joint portion 9. Therefore, relative rotation of the first joint portion 9 with respect to the first housing 6 can be reliably prevented. Movement of the first joint portion 9 in the axial direction with respect to the first housing 6 can be reliably prevented by forming the swage portions 89.

When the inclined portions 96 are formed, the small width grooves 9d are formed on both sides of the swage groove 9c, which is formed in the plate portion 9a of the first joint portion 9, in the axial direction throughout the whole circumference with the predetermined interval K1 therebetween. The deformation allowing portions 91 are formed between the small width grooves 9d and the swage groove 9c. Accordingly, the mechanical strengths of the deformation allowing portions 91 are made weaker than the mechanical strengths at places other than the deformation allowing portions 91 in the first joint portion 9. The inclined portions 96 are formed by causing such deformation allowing portions 91 to be deformed using the tool 95. For this reason, even when the mechanical strength of the first joint portion 9 itself is enhanced, the inclined portions 96 can be easily formed with a simple structure. In other words, without having any limitation on material selection for the first joint portion 9, relative rotation of the first joint portion 9 with respect to the first housing 6 and movement in the axial direction can be reliably prevented.

The small width grooves 9d are formed on both sides of the swage groove 9c in the axial direction throughout the whole circumference. For this reason, without aligning the relative positions between the first housing 6 and the first joint portion 9, the swage portions 89 can be formed in the first housing 6. Moreover, the inclined portions 96 can be formed to correspond to the swage portions 89. For this reason, swage fixing of the first joint portion 9 with respect to the first housing 6 can be easily performed.

Here, the deformation allowing portions 92 and 93 are also formed in each of the bearing holder 39 and the fixing projection portion 55 of the second joint portion 54. For this reason, operation and effects similar to those in swage fixing of the first joint portion 9 to the first housing 6 described above can be exhibited in swage fixing of the bearing holder 39 to the first housing 6 and swage fixing of the inner tube 56 and the fixing projection portion 55 of the second joint portion 54.

In the first embodiment described above, a case in which the small width grooves 9*d* are formed on both sides of the swage groove 9*c* of the first joint portion 9 in the axial direction throughout the whole circumference has been described. A case in which the small width grooves 39*d* are formed on both sides of the swage groove 39*c* of the bearing holder 39 in the axial direction throughout the whole circumference has been described. A case in which the small width grooves 55*b* are formed on both sides of the swage groove 55*a* of the fixing projection portion 55 in the second joint portion 54 in the axial direction throughout the whole circumference has been described. Accordingly, a case in which each of the deformation allowing portions 91 to 93 is formed throughout the entirety in the circumferential direction has been described.

However, the configuration is not limited thereto. Instead of forming each of the small width grooves 9*d*, 39*d*, and 55*b* throughout the whole circumference, a plurality of small width grooves may be formed in the circumferential direction. That is, a plurality of deformation allowing portions 91 to 93 may be formed side by side in the circumferential direction.

In this case, the swage portions 87 to 89 may be formed at places where the respective deformation allowing portions 91 to 93 are formed. In addition, each of the deformation allowing portions 91 to 93 and the swage portions 87 to 89 may not be a plurality of portions. At least one thereof need only be formed.

Even in such a case, relative rotation of the first joint portion 9 with respect to the first housing 6, relative rotation of the bearing holder 39 with respect to the first housing 6, and relative rotation of the second joint portion 54 with respect to the inner tube 56 can be prevented.

In the first embodiment described above, a case in which the inclined portions 96 are formed by respectively forming the deformation allowing portions 91 to 93 in the first joint portion 9, the bearing holder 39, and the second joint portion 54 and pressurizing these deformation allowing portions 91 to 93 using the tool 95 has been described. However, the configuration is not limited thereto. The inclined portions 96 communicating with the respective swage grooves 9*c*, 39*c*, and 55*a* may be formed in advance.

The inclined portions 96 are not limited to having a flat inclined surface and need only be provided in a recessed manner. For example, the inclined portions 96 may be formed in a curved manner.

In this case, the swage portions 87 to 89 need only be formed at places where the inclined portions 96 are formed. Even in the case of such a configuration, without having any limitation on material selection for the first joint portion 9, the bearing holder 39, and the second joint portion 54, relative rotation of the first joint portion 9 with respect to the first housing 6, relative rotation of the bearing holder 39 with respect to the first housing 6, and relative rotation of the second joint portion 54 with respect to the inner tube 56 can be prevented.

Second Embodiment

Figure 10:
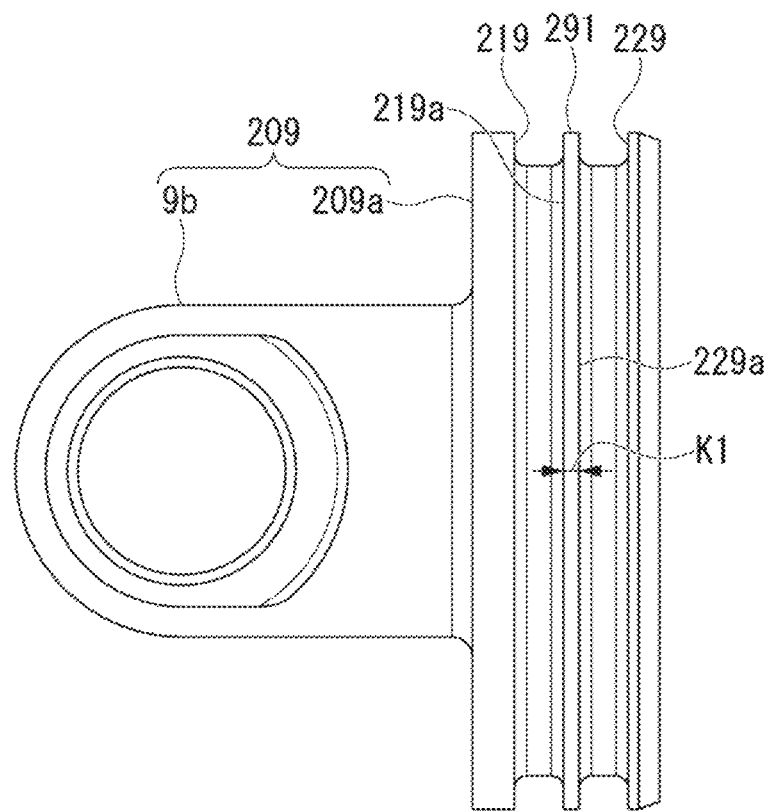
FIG. 10 is a side view of a first joint portion according to a second embodiment of the present invention.

Next, on the basis of FIG. 10, a second embodiment of the present invention will be described. FIG. 10 corresponds to FIG. 4 described above.

FIG. 10 is a side view of a first joint portion 209 according to the second embodiment. The same reference signs are applied to the same forms as in the first embodiment, and a description thereof will be omitted.

As illustrated in FIG. 10, the first embodiment and the second embodiment differ from each other in that the first joint portion 9 of the first embodiment has one swage groove 9*c*, whereas the first joint portion 209 of the second embodiment has two swage grooves 219 and 229 (a first swage groove 219 and a second swage groove 229).

More specifically, two (two strands of) swage grooves 219 and 229 (the first swage groove 219 and the second swage groove 229) are formed in a plate portion 209*a* of the first joint portion 209 throughout the whole circumference. The two swage grooves 219 and 229 are disposed with the predetermined interval K1 therebetween in the axial direction. That is, a deformation allowing portion 291 is formed between the two swage grooves 219 and 229. The deformation allowing portion 291 has a mechanical strength weaker than those at places other than the deformation allowing portion 291 in the first joint portion 209.

(Swaging Fixing Method)

Next, on the basis of FIG. 11, the swaging fixing method of the first joint portion 209 to the first housing 6 will be described.

Figure 11:
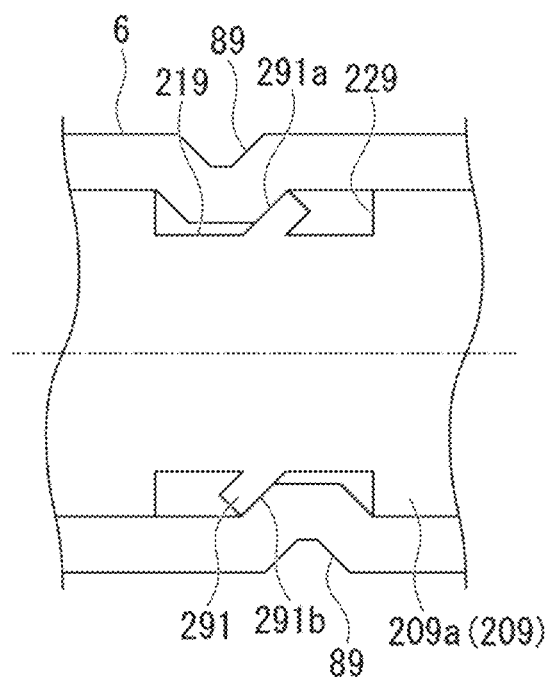
FIG. 11 is a view showing a state in which the first joint portion is subjected to swage fixing to the first housing according to the second embodiment of the present invention.

FIG. 11 is a view showing a state in which the first joint portion 209 is subjected to swage fixing to the first housing 6. FIG. 11 corresponds to FIG. 8B described above.

As illustrated in FIG. 11, after the plate portion 209*a* of the first joint portion 209 is fitted to the inner circumferential surface of the first housing 6, the tool 95 for swaging (refer to FIG. 8B, not illustrated in FIG. 11) is pressurized from an outward side in the radial direction at a position corresponding to each of the swage grooves 219 and 229 of the first housing 6. At this time, a position corresponding to the first swage groove 219 and a position corresponding to the second swage groove 229 are pressurized alternately in the circumferential direction. Consequently, the first housing 6 is deformed toward an inner side in the radial direction such that it is inserted into each of the swage grooves 219 and 229.

Since the deformation allowing portion 291 has a mechanical strength weaker than those at places other than the deformation allowing portion 291 in the first joint portion 209, the deformation allowing portion 291 is deformed such that it is pressed and expanded by the tool 95. For this reason, inclined portions 291*a* and 291*b* (a first inclined portion 291*a* and a second inclined portion 291*b*) are formed at places pressurized by the tool 95 in the whole circumference of the deformation allowing portion 291.

Here, the first inclined portion 291*a* of the deformation allowing portion 291 formed by pressurizing the first swage groove 219 using the tool 95 is inclined outward in the axial direction with respect to the first swage groove 219 from a side edge 219*a* of this first swage groove 219. That is, the first inclined portion 291*a* of the deformation allowing portion 291 formed by pressurizing the first swage groove 219 using the tool 95 is inclined such that it falls down to the second swage groove 229 side.

The second inclined portion 291*b* of the deformation allowing portion 291 formed by pressurizing the second swage groove 229 using the tool 95 is inclined outward in the axial direction with respect to the second swage groove 229 from a side edge 229a of this second swage groove 229. That is, the second inclined portion 291b of the deformation allowing portion 291 formed by pressurizing the second swage groove 229 using the tool 95 is inclined such that it falls down to the first swage groove 219 side.

Figure 12:
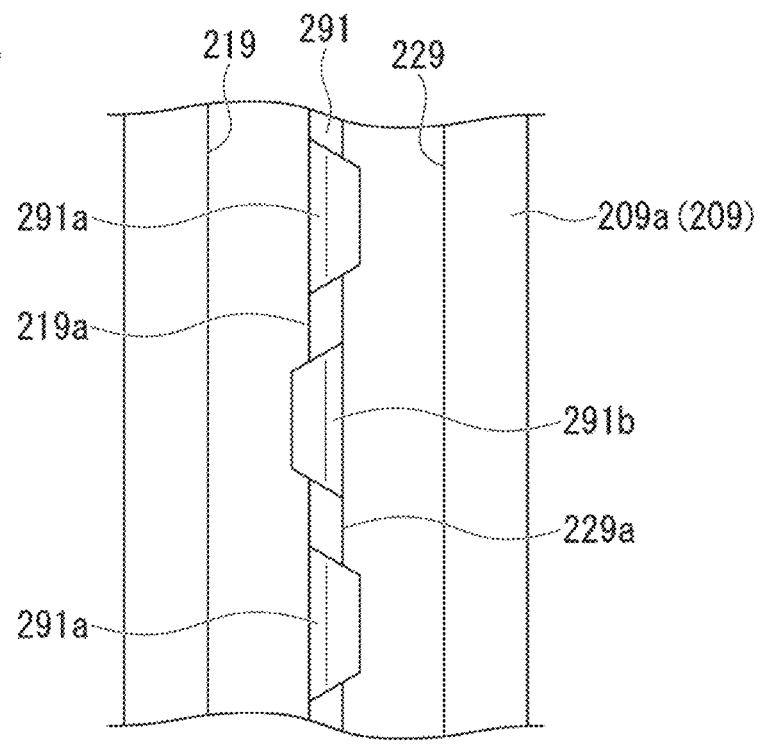
FIG. 12 is a simplified view illustrating a state in which inclined portions are formed in a part of a deformation allowing portion using the tool according to the second embodiment of the present invention.

FIG. 12 is a simplified view illustrating a state in which the two inclined portions 291a and 291b are formed in a part of the deformation allowing portion 291 in the first joint portion 209 using the tool 95, and the diagram corresponds to a side view of the first joint portion 9. FIG. 12 corresponds to FIG. 9 described above.

As illustrated in FIG. 12, using the tool 95, a position corresponding to the first swage groove 219 and a position corresponding to the second swage groove 229 are pressurized alternately in the circumferential direction. Therefore, as a result, the first inclined portion 291a and the second inclined portion 291b are disposed alternately in the circumferential direction. In other words, inclination directions of the inclined portions 291a and 291b formed in the deformation allowing portion 291 alternate in the circumferential direction.

Therefore, according to the second embodiment described above, it is possible to exhibit effects similar to those of the first embodiment described above. Since the inclination directions of the inclined portions 291a and 291b formed in the deformation allowing portion 291 alternate in the circumferential direction, relative rotation of the first joint portion 209 with respect to the first housing 6 can be prevented more reliably.

In the second embodiment described above, a case in which the two swage grooves 219 and 229 are formed in the plate portion 209a of the first joint portion 209 throughout the whole circumference has been described. A case in which the deformation allowing portion 291 is formed between the two swage grooves 219 and 229 has been described. However, the configuration is not limited thereto. Instead of forming each of the swage grooves 219 and 229 throughout the whole circumference, a plurality of swage grooves may be formed in the circumferential direction. That is, the deformation allowing portion 291 may be formed intermittently in the circumferential direction.

In the second embodiment described above, a case in which each of the inclined portions 291a and 291b is formed by pressurizing the deformation allowing portion 291 using the tool 95 has been described. However, the configuration is not limited thereto. The inclined portions 291a and 291b communicating with the respective swage grooves 219 and 229 may be formed in advance.

The inclined portions 291a and 291b are not limited to having a flat inclined surface and need only be provided in a recessed manner. For example, the inclined portions 291a and 291b may be formed in a curved manner.

Third Embodiment

Next, on the basis of FIG. 13, a third embodiment of the present invention will be described.

Figure 13:
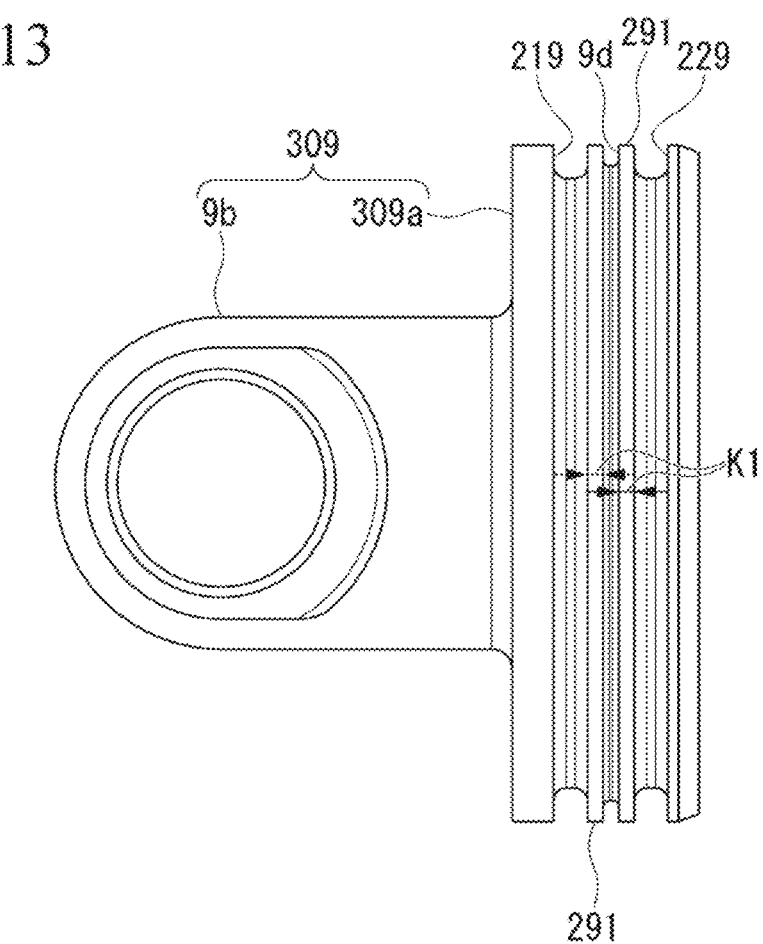
FIG. 13 is a side view of a first joint portion according to the second embodiment of the present invention.

FIG. 13 is a side view of a first joint portion 309 according to the second embodiment. FIG. 13 corresponds to FIG. 10 described above. The same reference signs are applied to the same forms as in the first embodiment or the second embodiment, and a description thereof will be omitted.

As illustrated in FIG. 13, the second embodiment and the third embodiment differ from each other in that one deformation allowing portion 291 is formed between the two swage grooves 219 and 229 in the second embodiment, whereas the small width grooves 9d are formed between the two swage grooves 219 and 229 throughout the whole circumference in the third embodiment.

The small width grooves 9d and the respective swage grooves 219 and 229 are formed with the predetermined interval K1 therebetween. The dimensions of the predetermined interval K1 are set as dimensions with which the mechanical strengths of the deformation allowing portions 91 become weaker than the mechanical strengths at places other than these deformation allowing portions 91. Since the small width grooves 9d are formed, the deformation allowing portions 291 are respectively formed between these small width grooves 9d and the respective swage grooves 219 and 229. That is, two deformation allowing portions 291 are formed.

According to such a configuration, after a plate portion 309a of the first joint portion 309 is fitted to the inner circumferential surface of the first housing 6, the tool 95 for swaging (refer to FIG. 8B, not illustrated in FIG. 13) is pressurized from an outward side in the radial direction at a position corresponding to each of the swage grooves 219 and 229 of the first housing 6. At this time, a position corresponding to the first swage groove 219 and a position corresponding to the second swage groove 229 are pressurized alternately in the circumferential direction. Consequently, the first housing 6 is deformed toward an inner side in the radial direction such that it is inserted into each of the swage grooves 219 and 229.

Since the deformation allowing portions 291 have a mechanical strength weaker than those at places other than the deformation allowing portions 291 in the first joint portion 309, the deformation allowing portions 291 are deformed such that they are pressed and expanded by the tool 95.

Therefore, according to the third embodiment described above, it is possible to exhibit effects similar to those of the second embodiment described above.

In the third embodiment described above, a case in which the two swage grooves 219 and 229 are formed in the plate portion 309a of the first joint portion 309 throughout the whole circumference has been described. A case in which the small width grooves 9d are formed between the two swage grooves 219 and 229 throughout the whole circumference has been described. A case in which the deformation allowing portions 291 are individually formed between the small width grooves 9d and the respective swage grooves 219 and 229 has been described. However, the configuration is not limited thereto. Instead of forming each of the swage grooves 219 and 229 and the small width grooves 9d throughout the whole circumference, a plurality of small width grooves may be formed in the circumferential direction. That is, each of the two deformation allowing portions 291 may be formed intermittently in the circumferential direction.

Also in the third embodiment described above similar to the second embodiment, the inclined portions 291a and 291b communicating with the respective swage grooves 219 and 229 may be formed in advance.

In the third embodiment described above, a case in which positions corresponding to the respective swage grooves 219 and 229 of the first housing 6 are pressurized alternately in the circumferential direction using the tool 95 from an outward side in the radial direction has been described. However, the configuration is not limited thereto. The same position of each of the swage grooves 219 and 229 in the circumferential direction may be pressurized using the tool 95. Since the small width grooves 9d are interposed between the two deformation allowing portions 291, the same position of each of the swage grooves 219 and 229 in the circumferential direction can be pressurized using the tool 95.

In the second embodiment and the third embodiment described above, the first joint portions 209 and 309 have been described. However, the configuration is not limited thereto. The configuration of each of the plate portions 209a and 309a of the first joint portions 209 and 309 may be applied to the bearing holder 39 or the second joint portion 54.

The present invention is not limited to the embodiments described above and includes those realized by adding various changes to the embodiments described above within a range not departing from the gist of the present invention.

For example, in the embodiments described above, a case in which the actuator 100 is the actuator 100 for opening/closing a vehicle door opening and closing the tailgate 2 of the automobile 1, for example, has been described. However, the configuration is not limited thereto. The actuator 100 can be employed for various devices.

In the embodiments described above, a case in which a rotation force of the shaft 14 of the motor portion 11 is transmitted to the screw shaft 38 via the speed reduction gear portion 27 has been described. However, the configuration is not limited thereto. The screw shaft 38 may be directly joined to the shaft 14. In this case, the screw shaft 38 may be rotatably supported or the shaft 14 may be rotatably supported by the bearing 40 provided in the bearing holder 39.

The speed reduction gear portion 27 is not limited to a two-stage planetary speed reduction mechanism, and various speed reduction mechanisms can be employed.

In the embodiments described above, a case in which the actuator 100 is a rod-shaped body including three housings 6 to 8, that is, the first housing 6 which has substantially a cylindrical shape, the second housing 7 which has substantially a cylindrical shape and of which the first end 7a (an end on the left side in FIGS. 2 and 3) is fitted and fixed to the inner circumferential surface at the second end 6b (an end on the right side in FIGS. 2 and 3) of the first housing 6, and the third housing 8 which has substantially a cylindrical shape and is fitted to the inner circumferential surface at the second end 7b of the second housing 7 in a retractable manner has been described. However, the configuration is not limited thereto. One housing may be adopted by integrating the first housing 6 and the second housing 7.

INDUSTRIAL APPLICABILITY

According to the fixing mechanism described above, movement of the attachment body in the axial direction with respect to the housing can be reliably prevented by forming the swage portion of the housing at a place where the swage groove is formed. In addition, the inclined portion is only formed in a part at the side edge of the swage groove and is not formed throughout the whole circumference. For this reason, relative rotation with respect to the housing can also be reliably prevented by forming the swage portion of the housing at a place where the inclined portion is formed. Furthermore, since the swage portion is formed in the inclined portion, there is no need to cause the attachment body itself to be deformed. For this reason, the mechanical strength of the attachment body can be enhanced, and there is also no limitation on material selection.

REFERENCE SIGNS LIST

1 Automobile
2 Tailgate (door)
3 Opening portion
6 First housing (housing)
9, 209, 309 First joint portion (attachment body)
9c, 39c, 55a, 219, 229 Swage groove
9d, 39d, 55b Small width groove
13 Armature
27 Speed reduction gear portion (speed reduction mechanism)
35 First stage planetary gear portion (speed reduction mechanism)
36 Second stage planetary gear portion (speed reduction mechanism)
38 Screw shaft (drive shaft)
39 Bearing holder (attachment body)
54 Second joint portion (attachment body)
55 Fixing projection portion
58 Nut member (driven portion)
87, 88, 89 Swage portion
91, 92, 93, 291 Deformation allowing portion
96 Inclined portion
100 Actuator for opening/closing vehicle door (actuator)
291a First inclined portion (inclined portion)
291b Second inclined portion (inclined portion)

What is claimed is:

1. A fixing mechanism comprising:
a tubular housing; and
an attachment body that is fitted to an inner circumferential surface of the housing,
wherein in the fixing mechanism, a swage portion is formed in the housing, and the housing and the attachment body are fixed to each other,
wherein the attachment body has
one swage groove which is formed throughout a whole circumference of an outer circumferential surface, and
at least one inclined portion which is formed in a part at a side edge of the swage groove and is inclined outward in an axial direction of the housing from the side edge of the swage groove,
wherein in the housing, the swage portion is formed at a place corresponding to the swage groove, where at least the inclined portion is formed, and
wherein at least the inclined portion is configured to serve as a deformation allowing portion having a mechanical strength weaker than mechanical strengths at places other than the inclined portion of the attachment body,
wherein the attachment body has a small width groove which is formed adjacent to the swage groove in the axial direction of the housing and is smaller than a width of the swage groove in the axial direction of the housing,
wherein the small width groove is formed throughout a whole circumference of the attachment body,
wherein a part between the swage groove and the small width groove is configured to serve as the deformation allowing portion,
wherein the swage portion opposes the swage groove in a radial direction of the housing through a gap, and
wherein an outer edge of the inclined portion is in contact with the attachment body in the axial direction with a gap between the inclined portion and the attachment body.

2. The fixing mechanism according to claim 1,
wherein the swage groove includes two swage grooves,
wherein the attachment body has the deformation allowing portion provided between the two swage grooves, and wherein the inclined portion includes at least two inclined portions, and inclination directions of the inclined portions alternate in a circumferential direction.

3. The fixing mechanism according to claim 1,
wherein the swage groove includes two swage grooves,
wherein the attachment body has a small width groove which is provided between the two swage grooves and is smaller than widths of the swage grooves in the axial direction of the housing, and
wherein a part between each of the swage grooves and the small width groove is configured to serve as the deformation allowing portion.

4. An actuator having the fixing mechanism according to claim 1,
wherein the attachment body is configured to serve as a joint portion which is provided at a first end of the housing and is attached to an attachment target portion.

5. The actuator according to claim 4 comprising:
an armature that is rotatably provided inside the housing;
a speed reduction mechanism that is provided inside the housing, is configured to reduce a speed of rotation of the armature, and is configured to output a reduced rotation;
a drive shaft that is joined to the speed reduction mechanism and extends in the axial direction of the housing;
a driven portion that is screwed onto the drive shaft and is configured to move along the drive shaft in a sliding manner in accordance with rotation of the drive shaft; and
two of the attachment bodies,
wherein the attachment bodies serve as the joint portion which is provided at a first end of the housing and bearing holders which are provided at a second end on a side opposite to the first end of the housing and rotatably support the drive shaft.

6. An actuator for opening/closing a vehicle door,
wherein the actuator according to claim 5 is used for driving of opening/closing a door which is provided to be able to open and close an opening portion.

7. An actuator for opening/closing a vehicle door,
wherein the actuator according to claim 4 is used for driving of opening/closing a door which is provided to be able to open and close an opening portion.

* * * * *